(12) United States Patent
Futamura

(10) Patent No.: US 7,930,748 B1
(45) Date of Patent: Apr. 19, 2011

(54) METHOD AND APPARATUS FOR DETECTING SCANS IN REAL-TIME

(75) Inventor: Kenichi Futamura, Middletown, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1331 days.

(21) Appl. No.: 11/321,169

(22) Filed: Dec. 29, 2005

(51) Int. Cl.
*G06F 11/00* (2006.01)

(52) U.S. Cl. .............. 726/24; 726/22; 726/23; 726/25; 713/165; 713/166; 713/167

(58) Field of Classification Search .............. 726/22–25; 713/165–167
See application file for complete search history.

(56) References Cited

U.S. PATENT DOCUMENTS

| | | | | |
|---|---|---|---|---|
| 4,914,650 | A * | 4/1990 | Sriram | 370/235 |
| 6,658,565 | B1 * | 12/2003 | Gupta et al. | 713/153 |
| 6,738,814 | B1 * | 5/2004 | Cox et al. | 709/225 |
| 6,954,775 | B1 * | 10/2005 | Shanklin et al. | 718/105 |
| 7,234,168 | B2 * | 6/2007 | Gupta et al. | 726/25 |
| 7,385,924 | B1 * | 6/2008 | Riddle | 370/235 |
| 2002/0124104 | A1 * | 9/2002 | Rappaport et al. | 709/238 |
| 2004/0044912 | A1 * | 3/2004 | Connary et al. | 713/201 |
| 2006/0083180 | A1 * | 4/2006 | Baba et al. | 370/252 |
| 2007/0065003 | A1 * | 3/2007 | Kellerman et al. | 382/159 |

FOREIGN PATENT DOCUMENTS

EP 0776112 A2 * 11/1996

OTHER PUBLICATIONS

Schuba et al, "Analysis of a Denial of Service Attack on TCP", 1997, pp. 1-16.*
CERT Advisory CA-1996-21 TCP SYN Flooding and IP Spoofing Attacks, Sep. 1996.*
Heberlein et al., "Attack Class: Address Spoofing", The 19th National Information Systems Security Conference, 1996.pp. 371-377, http://seclab.cs.ucdavis.edu/papers.html.*

* cited by examiner

*Primary Examiner* — Kambiz Zand
*Assistant Examiner* — Tongoc Tran

(57) ABSTRACT

A method and apparatus for detecting scans are described. In one example, a plurality of flows is allocated into a plurality of bins associated with different source internet protocol (SIP) addresses. A set of bin characteristics for at least one bin of the plurality of bins is generated if the at least one bin reaches a predefined flow capacity. Afterwards, the set of bin characteristics is compared to a scan characteristics list to determine if a potential scan exists.

20 Claims, 4 Drawing Sheets

US 7,930,748 B1

METHOD AND APPARATUS FOR DETECTING SCANS IN REAL-TIME

BACKGROUND OF THE INVENTION

1. Field of the Invention

Embodiments of the present invention generally relate to telecommunications systems and, more particularly, to a method and apparatus for detecting scans in a stream of data packets over a network.

2. Description of the Related Art

Reconnaissance or scanning typically serves as an initial indication of network intrusion: Whether scanning is conducted automatically by a worm or manually by a hacker, the ultimate goal is to gather information regarding the vulnerabilities of the network or associated machines. Thus, although not harmful in itself, a scan may lead to more destructive attacks or be indicative of potentially dangerous activity. Consequently, the detection of scans may serve as an effective method for early detection of various attacks (e.g., worms) or potential attacks (e.g., BotNets).

Thus, there is a need in the art for a method and apparatus for detecting scans.

SUMMARY OF THE INVENTION

In one embodiment, a method and apparatus for detecting scans are described. Specifically, a plurality of flows is allocated into a plurality of bins associated with different source internet protocol (SIP) addresses. A set of bin characteristics for at least one bin of the plurality of bins is generated if the at least one bin reaches a predefined flow capacity. Afterwards, the set of bin characteristics is compared to a scan characteristics list to determine if a potential scan exists.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
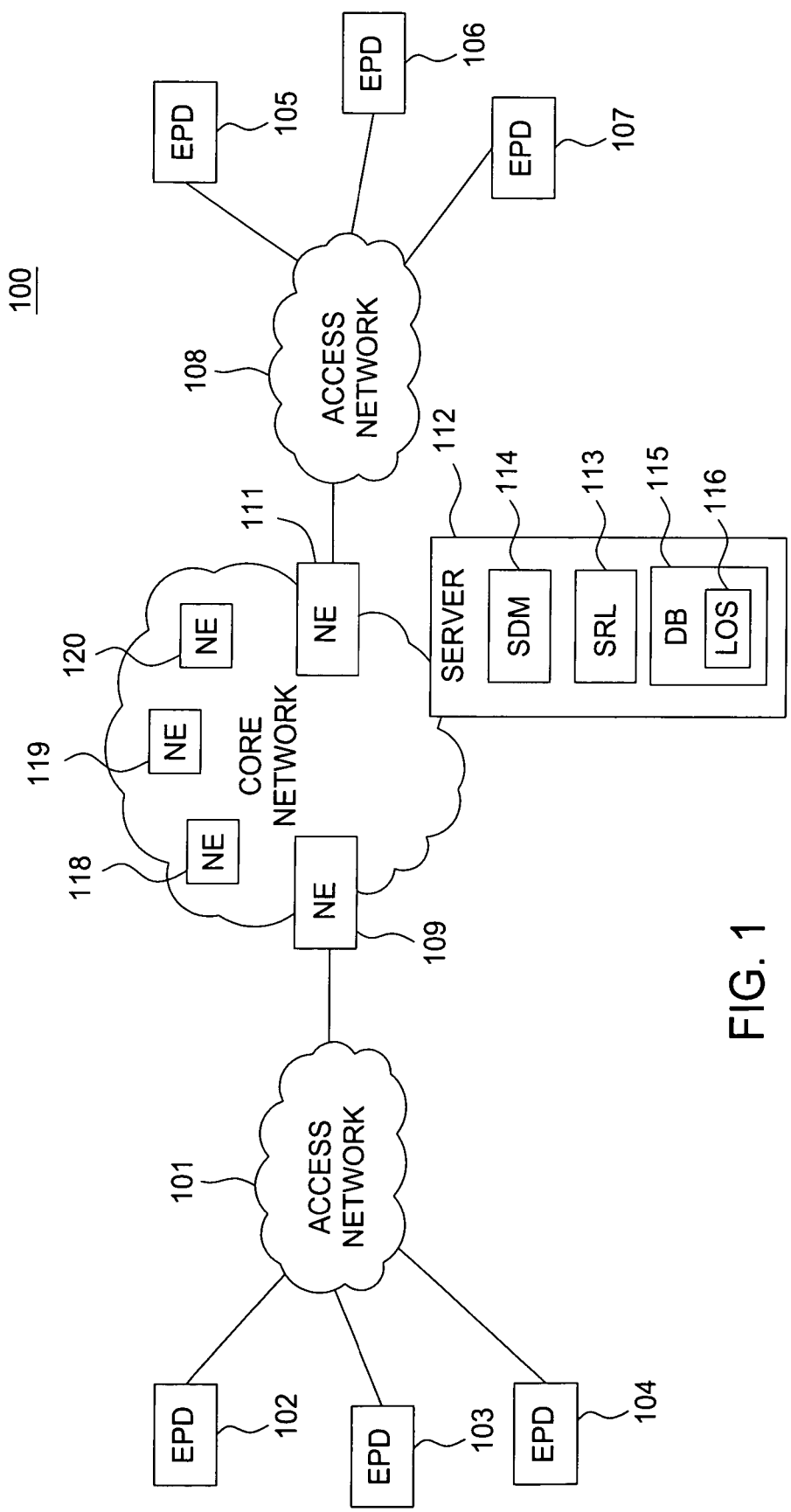
FIG. 1 is a block diagram depicting an exemplary embodiment of a communication system in accordance with the invention.

To better understand the present invention, FIG. 1 illustrates communication architecture 100 comprising an example network, e.g., a packet network related to the present invention. Broadly defined, a packet network is a network that is capable of carrying information as packetized data over an IP network. Exemplary packet networks utilized by the present invention include Internet protocol (IP) networks, such as an IPv4 network, an IPv6 network, and the like. An IP network is broadly defined as a network that uses Internet Protocol to exchange data packets. Furthermore, the present invention should not be interpreted to be limited by this particular illustrative architecture or limited to this type of network. For example, the present invention may be utilized to detect scans in a stream of data packets over an Internet service provider (ISP) network, a university network, or even a single home computer.

FIG. 1 is a block diagram depicting an exemplary configuration of a communication system 100 constructed in accordance with one or more aspects of the invention. A plurality of endpoint devices 102-104 are configured for communication with the core packet network 110 via an access network 101. Similarly, a plurality of endpoint devices 105-107 are configured for communication with the core packet network 110 (e.g., an IP based core backbone network supported by a service provider) via an access network 108. The network elements 109 and 111 may serve as gateway servers or edge routers for the network 110. Those skilled in the art will realize that although only six endpoint devices, two access networks, and five network elements (NEs) are depicted in FIG. 1, the communication system 100 may be expanded by including additional endpoint devices, access networks, and border elements without altering the present invention.

The endpoint devices 102-107 may comprise customer endpoint devices such as personal computers, laptop computers, personal digital assistants (PDAs), servers, and the like. The access networks 101 and 108 serve as a means to establish a connection between the endpoint devices 102-107 and the NEs 109 and 111 of the core network 110. The access networks 101, 108 may each comprise a digital subscriber line (DSL) network, a broadband cable access network, a local area network (LAN), a wireless access network (WAN), and the like. Some NEs (e.g., NEs 109 and 111) reside at the edge of the core infrastructure and interface with customer endpoints over various types of access networks. An NE is typically implemented as an edge router, a media gateway, a border element, a firewall, and the like. An NE may also include a component that resides within the network (e.g., NEs 118-120) such as a honeypot, a tarpit, a mail server, or like device. Similarly, an NE is responsible for providing flow data or flows to an application server 112. A flow (or flow data) comprises a set of packets wherein each packet of the flow is characterized by the same source IP (SIP) address, destination IP (DIP) address, source portal (sport), destination portal (dport), and protocol. A flow may also be defined by a FIN flag packet that indicates the end of the flow.

The core network 110 also comprises an application server 112 that contains a scan detection module (SDM) 114, scan rules list (SRL) 113, and a database 115. The application server 112 may comprise any server or computer that is well known in the art (also see FIG. 4). In one embodiment of the present invention, the server 112 comprises a dedicated application server that is configured to receive and process flow data from the network NEs in order to detect scans using the SDM 114. The database 115 may be any type of electronic collection of data that is well known in the art. The database 115 is used by the server 112 to store detected scans in a list of scans 116.

In one embodiment, the server 112 also contains a scan rules list (SRL) 113 that comprises a list of predefined scan classifications or scan types. The SRL 113 is used by the server 112 to classify the flow data in accordance to a scan type. For example, the scan type may be categorized as an A-class scan, an A-class random scan, a B-class scan, a B-class random scan, a C-class scan, a port scan, a completely random scan, and the like. These scan types may also include Internet control message protocol (ICMP) scans. Notably, each scan type classification is characterized by different characteristics or properties that may be categorized as being constant (x), distributed (*), unknown (?), or any of the previous three ("any"). For example, a C-class scan is characterized by (i) having a bytes per packet ratio that is constant (e.g., BPR=x), (ii) having a constant destination IP address for the first three octets and having a distributed fourth octet (e.g., DIP=x.x.x.*), (iii) originating from any source port (e.g., sport=any), (iv) having a constant destination port (e.g., dport=x), and (v) having a common protocol (e.g., protocol=x).

The characteristics of other non-icmp scan types include: an A-class scan (DIP=x.*.x.x, sport=any, dport=x, protocol=x, BPR=x), an A-class random scan (DIP=x.*.*.*, sport=any, dport=x, protocol=x, BPR=x), a B-class scan (DIP=x.x.*.x, sport=any, dport=x, protocol=x, BPR=x), a B-class random scan (DIP=x.x.*.*, sport=any, dport=x, protocol=x, BPR=x), a general random scan (DIP=*.*.*.*, sport=any, dport=x, protocol=x, BPR=x), and a port scan (DIP=x.x.x.x, sport=any, dport=*, protocol=x, BPR=x). Similarly, the characteristics of icmp scan types include: an A-class icmp scan (DIP=x.*.x.x, sport=any, dport=any, protocol=1, BPR=x, icmp type=x), an A-class random icmp scan (DIP=x.*.*.*, sport=any, dport=any, protocol=1, BPR=x, icmp type=x), a B-class icmp scan (DIP=x.x.*.x, sport=any, dport=any, protocol=1, BPR=x, icmp type=x), a B-class random icmp scan (DIP=x.x.*.*, sport=any, dport=any, protocol=1, BPR=x, icmp type=x), a general random icmp scan (DIP=*.*.*.*, sport=any, dport=any, protocol=1, BPR=x, icmp type=x), and a C-class icmp scan (DIP=x.x.x.*, sport=any, dport=*, protocol=1, BPR=x, icmp type=x).

Figure 2:
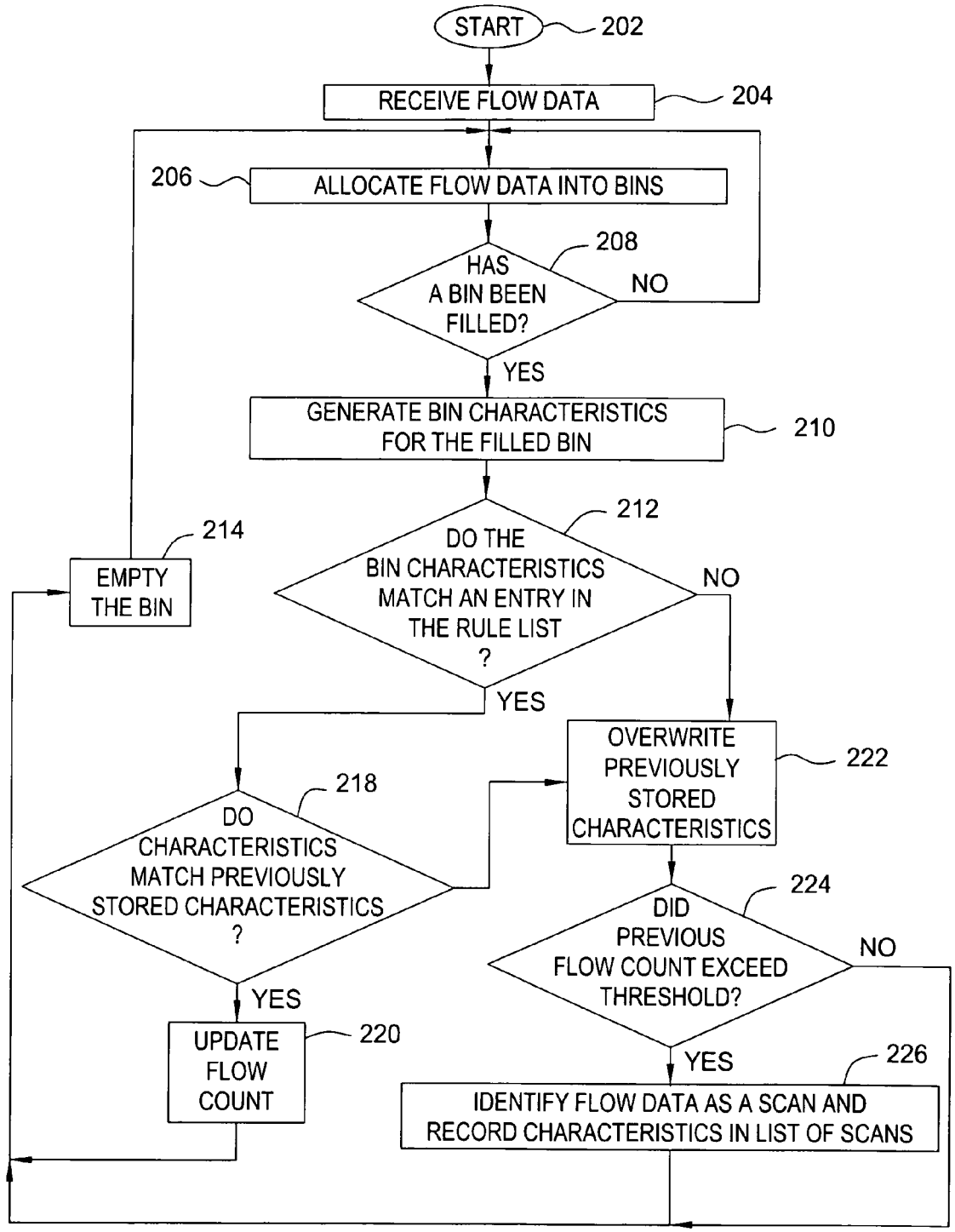
FIG. 2 is a flow diagram depicting an exemplary embodiment of a method for detecting scans in accordance with one or more aspects of the invention.

FIG. 2 is a flow diagram depicting an exemplary embodiment of a method 200 for detecting scans as related to one or more aspects of the invention. Although the present invention is described as utilizing flow-level data, the method 200 can also be used with packet-level data as well. The method 200 begins at step 202 and proceeds to step 204 where a plurality of flows (e.g., metadata) is received. In one embodiment, a NE of the core network reads in the flows and provides the flow data to the application server 112.

At step 206, each separate flow is recorded in one of a plurality of bins, e.g., in accordance to the source IP (SIP) addresses associated with the received flows. In one embodiment, the applications server 112 establishes a plurality of bins that is associated with a plurality of different SIP addresses. As separate flow data is received by the NE, the flows are allocated into the appropriate bin depending on the origin (i.e., the SIP address) of the flow(s).

At step 208, a determination of whether at least one bin has been filled. In one embodiment, a bin is filled when the number of flows reaches a predefined capacity value, MAXBIN (e.g., MAXBIN=15). If none of the bins have been filled, then the method 200 loops back to step 206 where the flows continue to be allocated into the bins. If at least one bin is filled (e.g., 15 flows have been collected), then the method 200 continues to step 210, where bin characteristics for the collective flow data (e.g., 20 flows) in the filled bin are generated. In one embodiment, the application server 112 generates the bin characteristics using the SDM 114.

In one embodiment, the bin characteristics include the source IP (SIP) address, destination IP (DIP) address, destination port (dport) ($1^{st}$, $2^{nd}$, and $4^{th}$ octets), source port (sport), protocol, transmission control protocol (TCP) flags, flow count, bytes per packet ratio (BPR), and icmp type (if applicable). The summary characteristics also contain additional information for meeting threshold requirement or for outputting information concerning the scans such as, starting and ending timestamps, packet count, and byte count. Notably, each bin characteristic is then categorized as being constant ("x"), distributed ("*"), or unknown ("?"). For example, if most of the flows in the bin are directed to a common destination port number, the destination port characteristic would be classified as being constant (i.e., dport="x"). Conversely, if most of the flows in the bin have different destination port numbers, then the characteristic would be categorized as distributed (i.e., dport="*"). Depending on the embodiment, "most" may be defined by a predefined threshold, BINTHRESH (e.g., BINTHRESH=13), which represents a number that must be met or exceeded to properly classify a bin characteristic. For example, if BINTHRESH=13, then 13 of the 15 flows contained in the bin must demonstrate a particular quality in order to be classified (e.g., if 13 flows all have the same DIP address, then the DIP characteristic of the bin is classified as "constant"). Each of the characteristics are processed and categorized in this manner.

At step 212, the generated bin characteristics are compared to a rules list. Specifically, a determination of whether the bin characteristics match any of the entries in a scan rules list 113 is made. If no matches are found, then the method proceeds to step 222 where the previously stored bin characteristics are erased (e.g., overwritten by NULL). If a match is found, then the method continues to step 218.

At step 218, a determination of whether the bin characteristics match the previously stored bin characteristics is made. In one embodiment, the server 112 determines if the new bin characteristics match the summary characteristics of the filled bin. Namely, each bin keeps a summary of previous bin characteristics (e.g., a flow count of a particular scan class type). If the bin characteristics match the previously stored summary characteristics (i.e., the new bin characteristics are associated with the same scan type, SIP, DIP octet pattern, BPR, etc., as the previously stored summary characteristics. For example, both characteristics correspond to the B-class type scan and have the same SIP, BPR, dport, protocol, and the same $1^{st}$, $2^{nd}$ and $4^{th}$ DIP octets) then the method 200 proceeds to step 220 where the flow count is updated. The method 200 then loops back the step 214 where the bin is emptied (but the summary characteristics are kept). If the bin characteristics do not match the previously stored summary characteristics, then the method 200 proceeds to step 222 where the previously stored summary characteristics are overwritten.

At step 224, a determination of whether the previous stored characteristics were associated with a flow count that exceeded a predetermined threshold. If the flow count exceeded a threshold (e.g., MINSCANLENGTH=75), then the method 200 proceeds to step 226 where the flow data associated with the previously stored bin characteristics are identified as a scan and the characteristics are recorded in the list of scans. In one embodiment, the characteristics (e.g., the time, duration, the number of flows, the number of packets, the number of bytes, and the ranges of each characteristic) are recorded in a list of scans 116 located in the database 115. In an alternative embodiment, the determination of whether the predefined threshold has been exceeded may be made after step 220. Namely, the flow data is classified as a scan as soon as the threshold is exceeded (e.g., as soon as 75 flow count is reached), i.e., in real time. The method 200 then loops back to step 214 where the bin is emptied and proceeds to step 206 until another bin has been filled. If the previously stored flow count does not exceed the predefined threshold, then the method 200 loops back to step 214 where the bin is emptied and proceeds to step 206 until another bin has been filled.

In another embodiment, the present invention may be configured to detect multiport scans. Multiport scans send packets to several different ports (possibly with different protocols and number of bytes per packet) at the same DIP address before proceeding to the next IP address. These scans may potentially be difficult to detect using the method 200 described above since many DIP addresses may be repeated.

Figure 3:
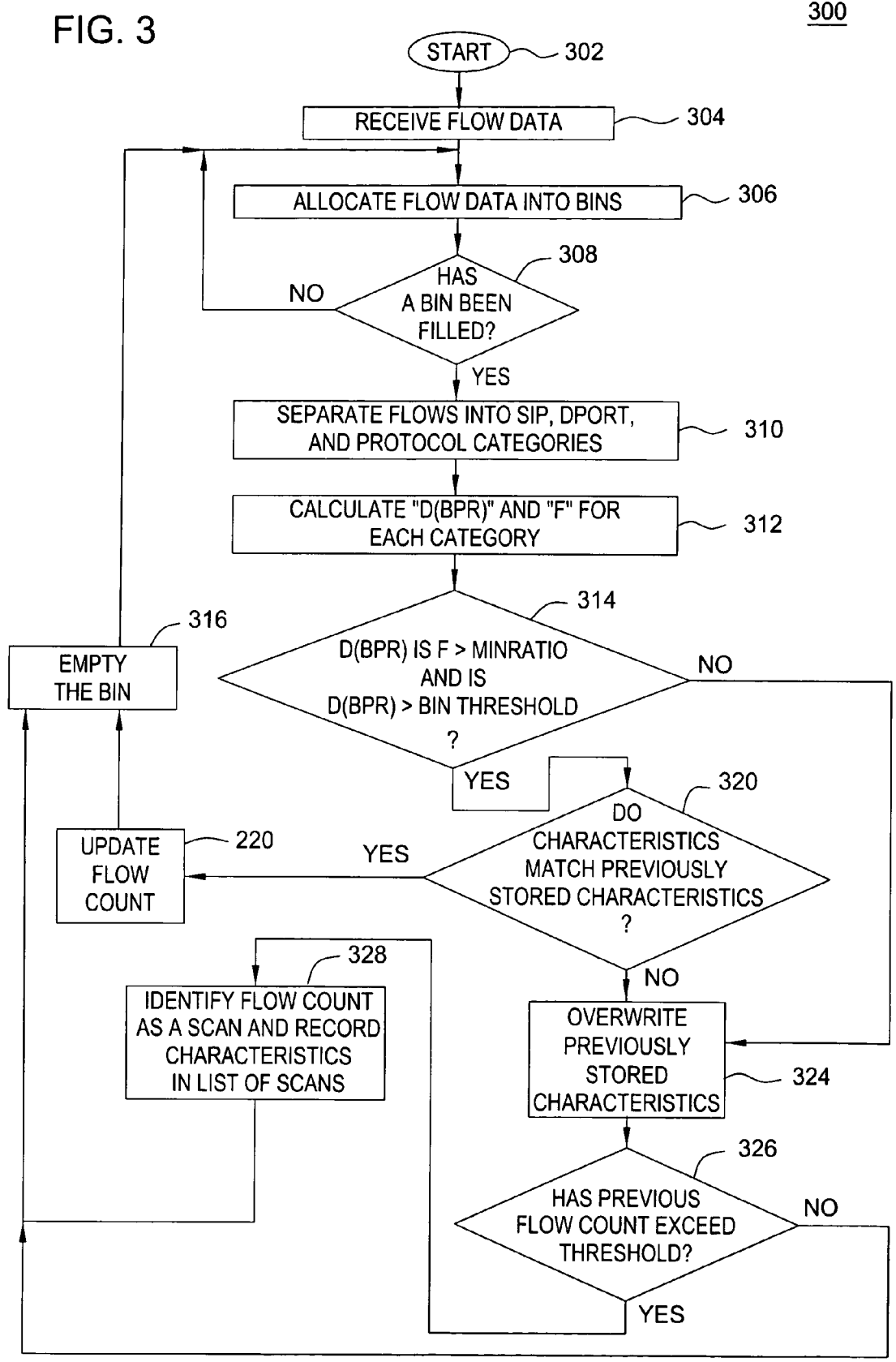
FIG. 3 is a flow diagram depicting an exemplary embodiment of a method for detecting multiport scans in accordance with one or more aspects of the invention.

FIG. 3 is a flow diagram depicting an exemplary embodiment of a method 300 for detecting multiport scans as related to one or more aspects of the invention. The method 300 begins at step 302 and proceeds to step 304 where a plurality of flows is received. In one embodiment, the NEs of the core network 110 read incoming metadata and provide the flow data to the application server 112.

At step 306, each separate flow is recorded in one of a plurality of bins in accordance to the flows' respective source IP (SIP) addresses. In one embodiment, the application server 112 establishes a plurality of bins that is associated with a plurality of different SIP addresses. As separate flow data is received by the NE, the flows are allocated into the appropriate bin depending on the origin (i.e., the SIP address) of the flow data.

At step 308, a determination of whether at least one bin has been filled. In one embodiment, a bin is filled when the number of flows in a given bin reaches a predefined value, MAXBIN (e.g., MAXBIN=27). If none of the bins have been filled, then the method 300 loops back to step 306 where the flows continue to be allocated into the bins. If at least one bin is filled (e.g., 27 flows have been collected), then the method 300 continues to step 310, where the flows are separated into different categories. In one embodiment, the flows are separated into categories by like SIP address, destination port, and protocol.

At step 312, the number of unique DIP addresses for a particular BPR (i.e., D(BPR)) and the total number of flows (i.e., "F") are determined for each of the separate categories of step 310.

At step 314, a determination as to whether D(BPR)/F is greater than a minimum ratio (e.g., D(BPR)/F>MINRATIO, where default MINRATIO=0.9) as well as if D(BPR) is greater than a predetermined threshold representing a number of DIP addresses with a particular BPR (e.g., D(BPR) >BINTHRESHOLD, where default BINTHRESHOLD=8) is made. If these conditions are not met, the method 300 continues to step 324 where the previously stored bin characteristics are erased (e.g., overwritten by NULL). In one embodiment, the SDM 114 is used to perform these calculations. If the conditions are met the method 300 proceeds to step 320.

At step 320, a determination of whether the bin characteristics match the previously stored summary characteristics is made. In one embodiment, the server 112 determines if the new bin characteristics match the summary characteristics of the filled bin. If the bin characteristics match the previously stored summary characteristics then the method 300 proceeds to step 322 where the flow count is updated. The method 300 then loops back the step 316 where the bin is emptied (but the summary characteristics are kept).

If the bin characteristics do not match the previously stored summary characteristics, then the method 300 proceeds to step 324 where the previously stored summary characteristics are overwritten.

At step 326, a determination of whether the previous stored characteristics were associated with a flow count that exceeded a predetermined threshold. If the flow count exceeded a threshold (e.g., MINSCANLENGTH=75), then the method 300 proceeds to step 328 where the flow data associated with the previously stored bin characteristics is identified as a scan and the characteristics of the scan are recorded in the list of scans. In one embodiment, these scans are recorded in a list of scans 116 located in the database 115. In an alternative embodiment, the determination of the predefined threshold is exceeded may be made after step 322. Namely, the flow data is classified as a scan as soon as the threshold is exceeded (e.g., as soon as 75 flows are reached).

The method 300 then loops back to step 316 where the bin is emptied and proceeds to step 306 until another bin has been filled. If the previously stored flow count does not exceed the predefined threshold, then the method 300 loops back to step 316 where the bin is emptied and proceeds to step 306 until another bin has been filled.

Figure 4:
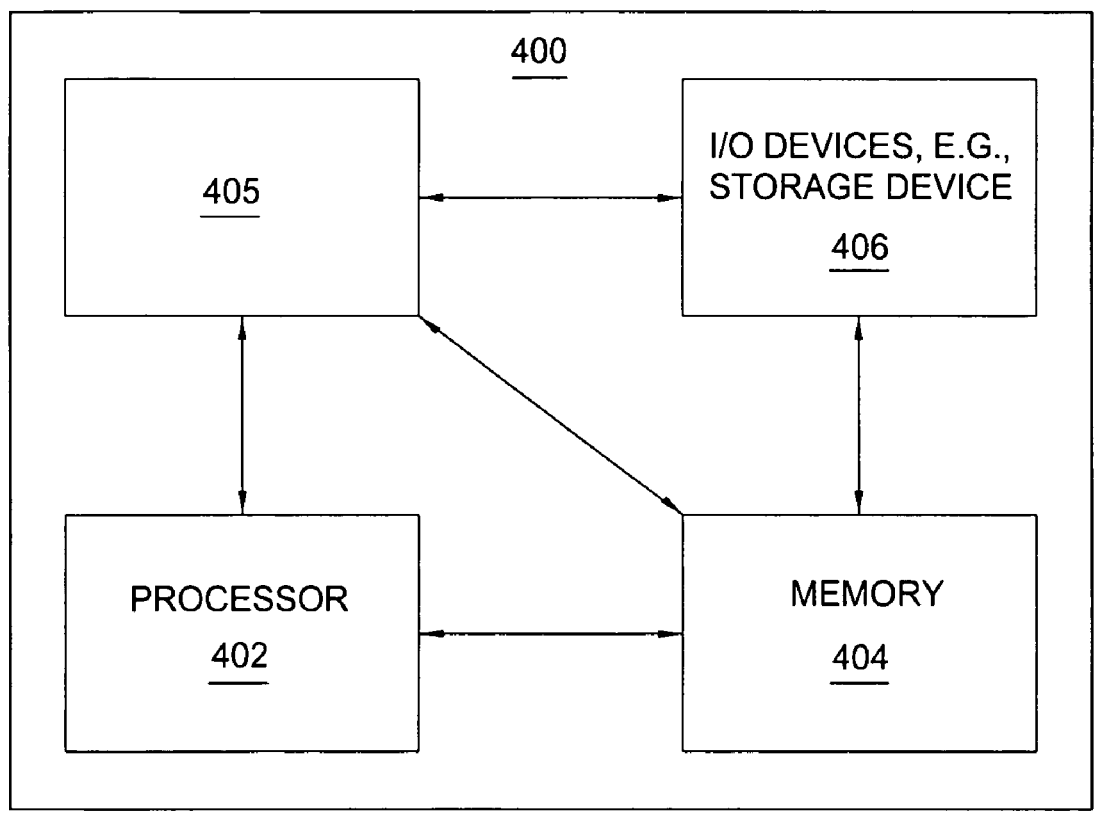
FIG. 4 is a block diagram depicting an exemplary embodiment of a computer suitable for implementing the processes and methods described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for detecting scans, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASICs), a general purpose computer or any other hardware equivalents. In one embodiment, the present module or process 405 for detecting scans can be loaded into memory 404 and executed by processor 402 to implement the functions as discussed above. As such, the present process 405 for detecting scans (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for detecting a potential scan, comprising:
  allocating a plurality of flows into a plurality of bins based upon a source internet protocol address of each of the plurality of flows, where each bin of the plurality of bins is associated with a different source internet protocol address;
  generating a set of bin characteristics for one bin of the plurality of bins if the one bin reaches a predefined flow capacity; and
  comparing the set of bin characteristics to a scan characteristics list to determine if the potential scan exists.

2. The method of claim 1, further comprising:
  updating summary characteristics of the one bin if the set of bin characteristics matches an entry in the scan characteristics list.

3. The method of claim 2, further comprising:
  updating a flow count of the summary characteristics if the set of bin characteristics matches the summary characteristics.

4. The method of claim 3, further comprising:
   detecting a scan if the updated flow count exceeds a predetermined threshold.

5. The method of claim 3, wherein the summary characteristics comprise a scan type and the flow count.

6. The method of claim 5, wherein the scan type comprises a class based scan.

7. The method of claim 1, wherein the bin characteristics comprise a source Internet protocol address, a destination internet protocol address, a source port, a destination port, a transmission control protocol flag, and a protocol.

8. A computer-readable medium having stored thereon a plurality of instructions, the plurality of instructions including instructions which, when executed by a processor, causes the processor to perform a method for detecting a potential scan, comprising:
   allocating a plurality of flows into a plurality of bins based upon a source internet protocol address of each of the plurality of flows, where each bin of the plurality of bins is associated with a different source internet protocol address;
   generating a set of bin characteristics for one bin of the plurality of bins if the one bin reaches a predefined flow capacity; and
   comparing the set of bin characteristics to a scan characteristics list to determine if the potential scan exists.

9. The computer-readable medium of claim 8, further comprising:
   updating summary characteristics of the one bin if the set of bin characteristics matches an entry in the scan characteristics list.

10. The computer-readable medium of claim 9, further comprising:
    updating a flow count of the summary characteristics if the set of bin characteristics matches the summary characteristics.

11. The computer-readable medium of claim 10, further comprising:
    detecting a scan if the updated flow count exceeds a predetermined threshold.

12. The computer-readable medium of claim 10, wherein the summary characteristics comprise a scan type and the flow count.

13. The computer-readable medium of claim 12, wherein the scan type comprises a class based scan.

14. The computer-readable medium of claim 8, wherein the bin characteristics comprise a source internet protocol address, a destination internet protocol address, a source port, a destination port, a transmission control protocol flag, and a protocol.

15. An apparatus for detecting scans a potential scan, comprising:
    an application server configured to:
       allocate a plurality of flows into a plurality of bins based upon a source internet protocol address of each of the plurality of flows, where each bin of the plurality of bins is associated with a different source internet protocol address;
       generate a set of bin characteristics for one bin of the plurality of bins if the one bin reaches a predefined flow capacity; and
       compare the set of bin characteristics to a scan characteristics list to determine if the potential scan exists.

16. The apparatus of claim 15, wherein the application server is further configured to:
    update summary characteristics of the one bin if the set of bin characteristics matches an entry in the scan characteristics list.

17. The apparatus of claim 16, wherein the application server is further configured to:
    update a flow count of the summary characteristics if the set of bin characteristics matches the summary characteristics.

18. The apparatus of claim 17, wherein the application server is further configured to:
    detect a scan if the updated flow count exceeds a predetermined threshold.

19. The apparatus of claim 17, wherein the summary characteristics comprise a scan type and the flow count.

20. The apparatus of claim 15, wherein the bin characteristics comprise a source Internet protocol address, a destination internet protocol address, a source port, a destination port, a transmission control protocol flag, and a protocol.

* * * * *